Sept. 17, 1946.  B. PREDMORE  2,407,768
METHOD OF MAKING RUBBER GOODS
Filed April 10, 1944  2 Sheets-Sheet 1

Inventor
Bert Predmore
By Rolcullet Bartholow
Attorneys

Sept. 17, 1946.   B. PREDMORE   2,407,768
METHOD OF MAKING RUBBER GOODS
Filed April 10, 1944   2 Sheets-Sheet 2
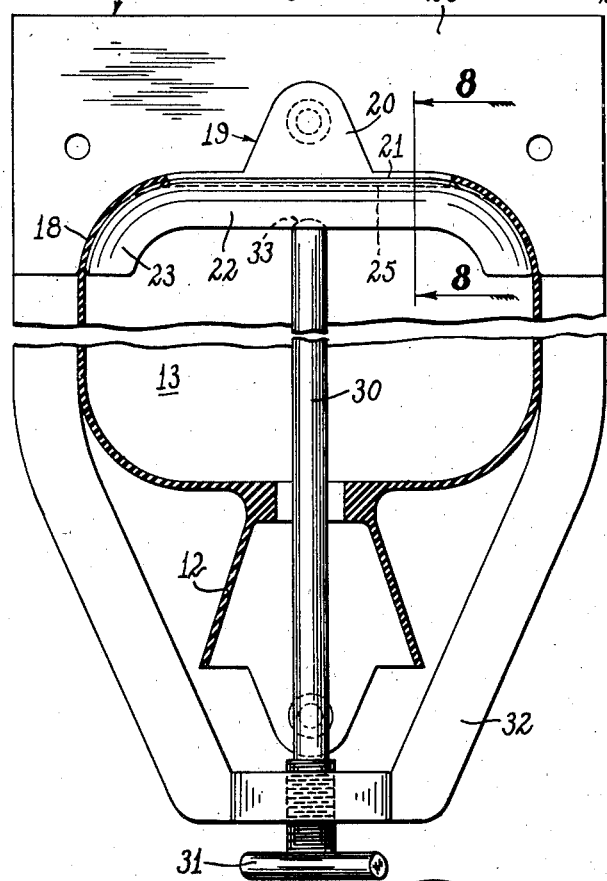
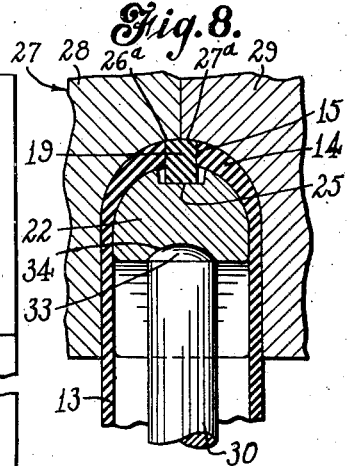
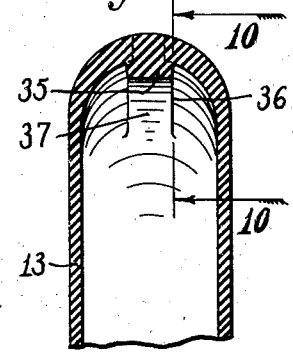
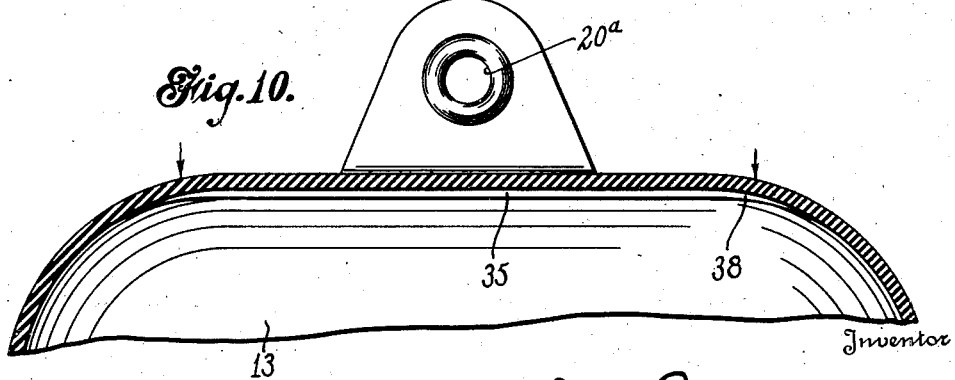
Inventor
Bert Predmore
By Rockwell & Bartholow
Attorneys Patented Sept. 17, 1946

2,407,768

UNITED STATES PATENT OFFICE 2,407,768

METHOD OF MAKING RUBBER GOODS

Bert Predmore, New Haven, Conn., assignor to The Seamless Rubber Company, New Haven, Conn., a corporation of Connecticut Application April 10, 1944, Serial No. 530,323

2 Claims. (Cl. 18—59)

This invention relates to methods of making rubber goods and, more particularly, to methods of making hollow rubber articles such, for example, as water bottles.

In Patent No. 1,442,357 of John W. Patterson, there is described a method of manufacturing articles in the nature of rubber water bottles, in which method a two-part mold is employed, and an inner core, the bottle body being formed in the mold with an open portion or slit in its lower end, through which open portion or slit the core is withdrawn. After withdrawal of the core, the slit is closed by a rubber piece, the latter in uncured state being placed in position to close the slit and the operation being completed by placing the rubber parts in a suitable press and subjecting them to heat and pressure with the object of providing a one-piece molded and vulcanized structure which is entirely closed so as to be leakproof. In such operation, that is to say, while molding and vulcanizing are taking place, the inserted piece used for closing the end of the receptacle could be held in position by a forming element introduced into the receptacle interior in the manner described in Murray Patent No. 998,977.

In spite of the skill which has been employed for many years in the making of articles of this type, there has been too frequent difficulty arising from failure to close the lower end of the receptacle against leakage and failure to provide a sufficiently strong wall structure at the lower end of the receptacle. The lower end of the receptacle usually carries a perforated tab, and through this tab considerable strain is apt to be placed upon the wall structure when the article is in use. Rubber water bottles, for example, are frequently subjected to rough and severe usage, and a bottle which will not withstand such usage is unsatisfactory. In particular, there has, in the past, been a weak and unsatisfactory joint effected between the inserted rubber piece and the slotted receptacle structure, and in many cases this has been evidenced by thin flange-like elements on the margins of the piece which stood out from the inner surface of the bottle, thereby providing a place where, if there was not leakage of liquid, there was in any case the possibility that, under strain, a tear would occur which would cause leakage.

One of the objects of the present invention is to overcome these defects in prior methods.

Another object is to provide a method by which receptacles of the type referred to can be provided, in an economical and commercially practical manner, with a strong, durable, leakproof wall structure in the region utilized in the withdrawal of the inner core used in the molding of the principal parts of the receptacle.

To these and other ends. the invention consists in the novel features to be hereinafter described and finally pointed out in the claims.

In the accompanying drawings:

Fig. 7 is a sectional view showing the introduction of the inserted piece into the slit in the receptacle, and the forming element holding it in place;

Fig. 8 is an enlarged section on line 8—8 of Fig. 7;

Fig. 9 is a sectional view showing the closed lower end of the receptacle; and

Fig. 10 is a section on line 10—10 of Fig. 9, on a smaller scale.

Figure 1:
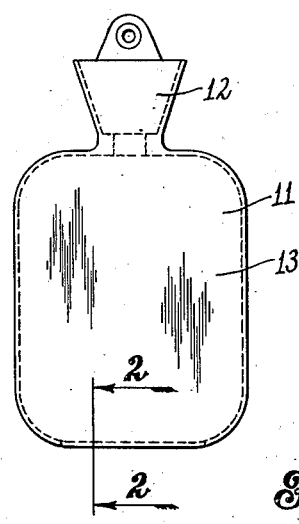
Fig. 1 is a view of the water bottle as it appears after the withdrawal of the inner core and before the lower end is closed.
Figure 2:
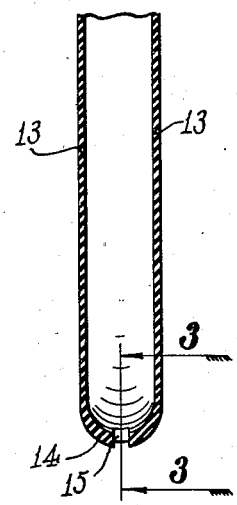
Fig. 2 is an enlarged section on line 2—2 of Fig. 1.
Figure 3:
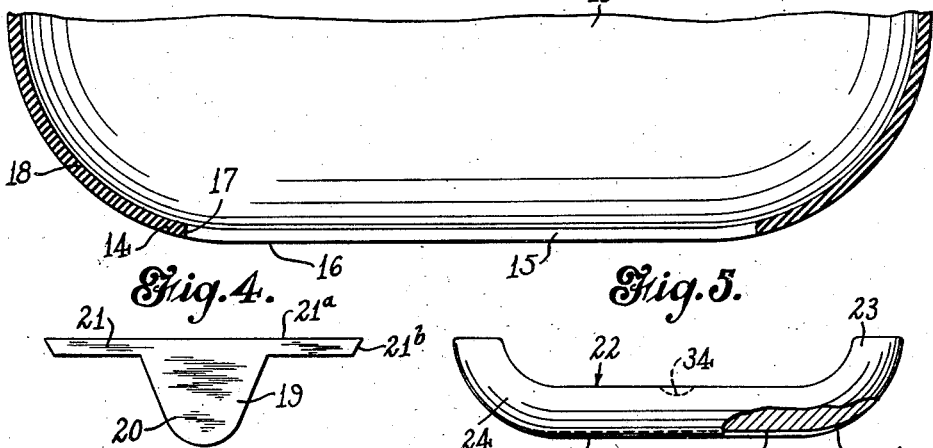
Fig. 3 is a section on line 3—3 of Fig. 2.

In the drawings, the process is illustrated as practiced in the manufacture of a rubber water bottle, and in Figs. 1, 2, and 3 there is shown a water bottle 11 in the condition in which it is received from the forming mold. The forming mold, with its inner core, is not shown herein, but it may be of the general structure shown in Patterson Patent No. 1,442,357. The article or blank 11 is constructed of rubber or rubberlike material and has at the top a filler spout or funnel 12 of the usual kind. The article has a body comprising opposing planar walls 13 and a lower end wall 14. At the stage indicated, these walls have been formed to the desired shape and have been subjected to heat so as to be cured. The end wall 14 is of curved cross section and is preferably slightly thicker than the walls 13. In wall 14, there is an elongated slit 15, and it is through this slit that, in the manufacture of the article. the inner core was withdrawn from the forming mold in a direction downwardly with reference to Fig. 1. The slit 15 extends substantially throughout the length of the straight portion 16 of wall 14, there being provided at the ends of the slit end surfaces 17. From each end surface 17, the wall 14 is continued laterally (Fig. 3) and upwardly in a gradually curved portion 18 integrally connected to the walls 13.

Figure 4:
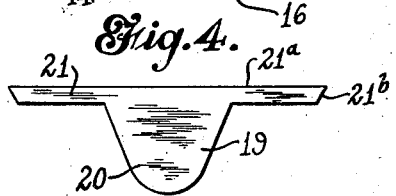
Fig. 4 is a view of the uncured rubber piece to be inserted, on a smaller scale.

In Fig. 4 there is shown a piece 19 of uncured rubber sheet, this piece having a thickness substantially equal to that of the slit 15. This piece is composed of a tab portion 20 from the upper end of which (Fig. 4) project integral lateral extensions 21 that are of the same thickness as the remainder of the piece.

Figure 5:
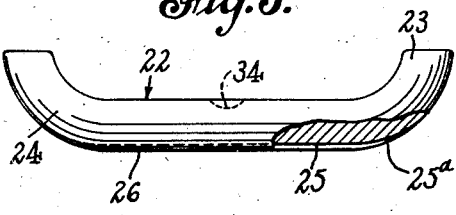
Fig. 5 is a detail view of the forming element, the same being partly broken away.

In Fig. 5 there is shown a forming element 22 which is in the nature of a bar having turned-up ends 23, the bar having such an external shape as to enable it to be nested within the lower end of the blank (Fig. 3), under which conditions the end portions 23 of the bar support the curved portions 18 of the blank. The outer surface of the element 22 is curved as shown at 24 in order to conform to the opposing inner surfaces of the blank. It will be noted also that the forming bar is provided with a groove 25 extending lengthwise thereof in a median plane, at what is in Fig. 5 the lower surface of the bar. The groove 25 extends throughout the length of the straight surface 26 at the lower part of the bar (Fig. 5) and the groove is continued somewhat beyond the ends of this straight portion onto the curved end portions 23, upon which end portions the groove decreases in depth, as shown at $25^a$, until it disappears. The groove 25, as appears from Fig. 6, has a width somewhat greater than that of the slit 15; it is a comparatively shallow groove, opening to the curved external surface of the forming bar, and by preference the side surfaces $25^b$ of this groove are slightly divergent toward the curved external surface of the forming bar.

In Figs. 7 and 8, there is shown a forming mold, generally indicated at 27, adapted to receive the blank, said mold comprising separable elements 28 and 29 adapted to enclose the lower end portion of the blank to cooperate with the forming element 22. Pressure is adapted to be exerted upon the forming element 22 in a suitable manner, as by the use of a pressure shank 30 provided with a handle 31 screwing in and out of a frame-like element 32 provided on element 29. At its inner free end, the pressure shank 30 has a convex surface 33 engaging a concave socket 34 provided at the inner side of the forming element 22. It will be understood that, by turning the handle 31 in the proper direction, the shank 30 may be advanced so as to press the forming element in the direction of the lower end of the blank.

Figure 6:
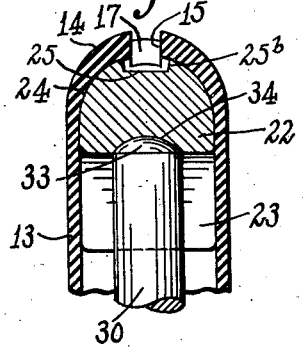
Fig. 6 is a sectional view showing the introduction of the forming element into the receptacle.

In the operation of closing the lower end of the blank, the first step may be the introduction of the element 22 into the interior of the blank so as to have the position shown in Fig. 6. The element 22 may be readily introduced into the blank through the slit 15, as will be readily understood. This position of the element 22 relatively to the blank is also shown in Figs. 7 and 8. Element 22 being in the position indicated, the next step is to introduce the rubber piece 19 into the open end of the blank so that it is in a position to be acted upon to close the slit. In this position of the rubber piece, the straight inner edge of the piece (indicated at $21^a$ in Fig. 4) lies within, and against the inner surface of, the groove 25. At the extremities of the extensions 21 of the rubber piece are inclined surfaces $21^b$ (Fig. 4), and these surfaces, which diverge toward the interior of the blank, are located in close proximity to and overlie the surfaces 17 at the ends of the slit, as indicated in Fig. 7.

The next step is to place the blank and its associated parts in the mold 27, as shown in Figs. 7 and 8, the shank or screw 30 being manipulated to hold the forming element 22 strongly against the end portion of the blank and against the inserted piece 19, the blank and the inserted piece being supported by the mold parts in the manner shown. The members 28 and 29 of the split mold have surfaces including the surfaces $26^a$ and $27^a$ which abut the external surface of the inserted piece.

The next step is to subject the mold to pressure and heat in a molding press for the purpose of flowing the rubber of the inserted piece into the walls of the blank so as to close the slit in a leakproof manner. Initially, the inserted piece has its side surfaces spaced from the side walls of the groove 25, as shown in Fig. 8, but, upon the application of pressure and heat, the material of the rubber piece is flowed laterally (Fig. 8) to fill the groove so as, in effect, to head over the inserted piece within the interior of the blank to produce a rib with thick, substantial retaining shoulders.

The shape of the completed article is shown in Figs. 9 and 10. In Fig. 9, the dotted lines show the original location of the slit in the blank and it will be apparent that the blank has at its inner surface a rib 35 of greater width than the original slit. This rib presents shoulders 36 at its side faces and a flat surface 37 at its inner face. The projection of the rib into the interior of the bottle is preferably somewhat less than the original depth of the slit.

The divergence of the surfaces $25^b$ at the sides of the groove 25 facilitates the removal of the forming element 22 after the molding step, just referred to, has been completed. After completion of the molding of the inserted piece, the forming element can be removed endwise through the neck of the bottle.

In Fig. 10, the original location of the end surfaces 17 of the slit is indicated by arrows and it will be noted that beyond these locations the rib 35 is tapered to provide tapered extremities 38 that merge into the wall portions 18 of the article at the inner faces of such portions. It will be understood, therefore, that the rib 35 not only projects laterally beyond the original slit at opposite sides but also projects lengthwise beyond the slit, and it will also be understood that, by being substantially wider than the slit, the rib is very effectively connected in an integral manner to the walls that are at the sides and ends of the original slit.

In connection with the new process, it is apparent that, for providing thick, well-defined shoulders on the inserted piece of rubber, there is furnished at the interior of the blank a certain defined space supplied by the groove 25 or an equivalent recessed portion, in which the material may flow freely in a lateral direction (to a predetermined controlled extent) from the inner part of the inserted piece (Fig. 8), the flow being substantially at right angles to the general plane of the receptacle. It is also to be understood that, when the parts are placed in mold 27 and the forming element 22 forced against the inserted piece, with the mold holding the inserted piece in place (Fig. 8), the inserted piece is subjected to compression in a direction generally lengthwise of the blank. The result, therefore, is that, under the action of the heat upon the rubber, the latter will flow laterally under the compressive effect, to fill up the open spaces in the groove 25, the flow being limited by the side surfaces of the groove against which the rubber is pressed. The forming element acts upon the inner surface of the inserted piece to exert compression thereon, and the inner surface of the mold presses the inserted piece in an inward direction relatively to the blank to cause the rubber to flow laterally into and fill up its assigned space over the margins of the slit.

The tab portion 20 of the inserted piece is usually provided with a perforation 20ª but the procedure in perforating the tab forms no part of the present invention.

By the present invention, a very strong wall structure is provided at the lower end of the bottle or other receptacle, and this structure will not be torn or ruptured even when the article is subjected to very hard usage. In the article as completed, any leakage of water through the originally slitted portion of the receptacle is obviated because the relatively thick rib portion at the interior of the bottle is effectively joined and vulcanized to the wall of the bottle in a manner obviating formation of thin connecting portions insecurely attached to the main wall.

These and other advantages of the improved structure will be apparent to those skilled in the art.

It is of course understood that the receptacle walls as well as the inserted piece are made of a vulcanizable or thermosetting plastic such as compounded rubber or compounded rubberlike material and that the heat used in the operation of closing the receptacle has the effect of vulcanizing the composition or effecting thermosetting.

Various changes in the detailed procedure and in the form of the article may be made without departing from the principles of the invention or the scope of the claims.

What I claim is:

1. The method of closing the slitted end of a substantially planar receptacle of vulcanizable material, which comprises inserting a piece of vulcanizable material into the slit in such a manner that a substantial part of the piece extends inwardly into the receptacle, heating the inserted piece and the adjacent parts of the receptacle to cause the material to flow more readily, and subjecting the article in the region of the slit to the pressure of inner and outer members which compress the piece generally lengthwise of the receptacle although permitting the material in the inner end portion of the piece to flow laterally away from the general plane of the piece, the inner member having a recess extending laterally of said receptacle into which such material flows for the purpose of creating shoulders of a prescribed contour overlying the edges of the slit.

2. The method of closing the slitted end of a substantially planar receptacle of vulcanizable material, which comprises inserting a substantially planar piece of vulcanizable material into the slit in such a manner that a substantial portion of the piece projects into the interior of the receptacle, heating the inserted piece and the adjacent parts of the receptacle to cause the material to flow more readily, and subjecting the article in the region of the slit to the pressure of members disposed respectively inwardly and outwardly of the receptacle, such pressure being generally lengthwise of the receptacle, the inner of said members having a recess extending laterally of said receptacle into which the material in the inner end portion of the inserted piece flows in a generally lateral direction to fill an assigned space in order to provide shoulders overlying the slit, the recess in said member being in the form of a longitudinal groove decreasing in depth at the ends.

BERT PREDMORE.